(12) United States Patent
Cook

(10) Patent No.: US 7,934,463 B2
(45) Date of Patent: May 3, 2011

(54) FREE SHAPE GAUGE BY LASER POINTER

(75) Inventor: David Cook, South Lyon, MI (US)

(73) Assignee: DENSO International America, Inc., Southfield, MI (US)

( * ) Notice: Subject to any disclaimer, the term of this patent is extended or adjusted under 35 U.S.C. 154(b) by 250 days.

(21) Appl. No.: 12/408,758

(22) Filed: Mar. 23, 2009

(65) Prior Publication Data

US 2010/0236471 A1    Sep. 23, 2010

(51) Int. Cl.
G01D 11/28 (2006.01)
G12B 11/04 (2006.01)
G12B 11/02 (2006.01)

(52) U.S. Cl. .. 116/286; 116/62.1; 116/334; 116/DIG. 5; 362/23; 362/29; 362/30

(58) Field of Classification Search .................. 116/284, 116/286, 288, 289, 305, 327, 328, 331, 332, 116/334, 62.1, 62.3, 62.4, DIG. 5, DIG. 6, 116/DIG. 35, DIG. 36; 362/23, 26, 28, 29, 362/30

See application file for complete search history.

(56) References Cited

U.S. PATENT DOCUMENTS

| 4,761,715 | A | * | 8/1988 | Brooks | 362/23 |
| 5,353,735 | A | * | 10/1994 | Arai et al. | 116/286 |
| 7,207,117 | B1 | | 4/2007 | Cook et al. | |
| 7,426,864 | B2 | | 9/2008 | Cook | |
| 7,448,341 | B2 | * | 11/2008 | Cook et al. | 116/286 |
| 7,779,774 | B2 | * | 8/2010 | Liu | 116/286 |
| 2007/0157745 | A1 | * | 7/2007 | Takato et al. | 73/866.3 |
| 2008/0173233 | A1 | | 7/2008 | Liu | |

FOREIGN PATENT DOCUMENTS

JP    2005-181017    7/2005

* cited by examiner

Primary Examiner — Amy Cohen Johnson
(74) Attorney, Agent, or Firm — Harness, Dickey & Pierce, PLC

(57) ABSTRACT

A gauge can include a face plate and an indication area disposed about a gauge center. The indication area can have a shape that can be defined by a bottom boundary, a top boundary, and first and second ends joining respective ends of the top and bottom boundaries. The top and bottom boundaries can be spaced apart from the gauge center by first and second radial distances. The indication area can be angled rearward relative to the face plate with the top boundary being spaced rearward from the face plate. A plurality of indicia can be disposed on the face plate. The gauge can further include a laser system disposed behind a rear side of the face plate and arranged to rotate and reflect a laser beam to a position adjacent or relative to a specific one of the plurality of indicia based on a signal output from a sensor.

20 Claims, 6 Drawing Sheets

FREE SHAPE GAUGE BY LASER POINTER

FIELD

The present disclosure relates generally to gauges such as instrument panel gauges for an automobile. More particularly, the present disclosure relates to gauges having a laser pointer to indicate a valve being displayed by the gauge.

BACKGROUND

This section provides background information related to the present disclosure which is not necessarily prior art.

Gauges are often used throughout industry to display a value of a parameter being monitored by the gauge. In the automotive industry, a vehicle typically includes an instrument cluster with a plurality of gauges for displaying operating conditions of the vehicle. These gauges can monitor parameters such as vehicle speed, engine speed, coolant temperature, battery voltage, fuel level and the like. The gauges can include an analog or digital readout for displaying the value of the measured parameter. An analog gauge typically includes a dial surface having a numerical scale thereon and a pointer that rotates or traverses across the gauge to a point on the numerical scale which indicates the value of the parameter being monitored.

One limitation of current analog gauges is their general inability to indicate markings on numerical scales of noncircular shaped gauges. As many analog gauges use a rigid pointer disposed at a center of the gauge, the gauge and associated numerical scale must be constructed in a circular shape so that the pointer can align with the numerical scale disposed around the gauge. If the gauge was noncircular, such as an elliptical gauge for example, the pointer located at a center of the gauge would not be able to align with the markings on the numerical scale at both the minor and major axes of the ellipse.

Accordingly, there exists a need for a gauge assembly that overcomes the aforementioned and other disadvantages.

SUMMARY

This section provides a general summary of the disclosure, and is not a comprehensive disclosure of its full scope or all of its features.

In one form, a gauge is provided and can include a face plate having a gauge center and an indication area disposed about the gauge center. The indication area can have a bottom boundary and a top boundary spaced apart from the bottom boundary, and the bottom boundary can be spaced apart from the gauge center by a first radial distance. The indication area can be angled rearward relative to a front side of the face plate such that the top boundary of the indication area is spaced rearward a distance from the front side of the face plate. A plurality of indicia can be disposed on one of the front side of the face plate and the indication area. The gauge can also include a stationary laser diode, a sensor and a drive system. The laser diode can be positioned behind a rear side of the face plate and can point away from the rear side of the face plate, and the laser diode can be arranged to project a beam perpendicular to the face plate. The gauge can also include a sensor and a drive system. The sensor can be arranged to monitor a parameter and output a signal indicative of a value of the parameter. The drive system can be disposed behind the rear side of the face plate, and can be arranged to rotate the beam from the laser to a position adjacent to a specific one of the plurality of indicia based on the signal output from the sensor.

In another form, a gauge is provided and can include a face plate having a gauge center and an indication area disposed about the gauge center. The indication area can have a shape that can be defined by a bottom boundary, a top boundary, and first and second ends joining respecting ends of the top and bottom boundaries. The bottom boundary can be spaced apart from the gauge center by a first radial distance. The top boundary can be spaced apart from the gauge center by a second radial distance greater than the first radial distance and can thereby define a width of the indication area. The indication area can be angled rearward relative to a front side of the face plate such that the top boundary of the indication area is spaced rearward a distance from the front side of the face plate and the bottom boundary is contiguous with the front side of the face plate. A plurality of indicia can be disposed on one of the front side of the face plate and the indication area. The gauge can further include a stationary laser diode, a sensor, and a drive system. The stationary laser diode can be positioned behind a rear side of the face plate and can point away from the rear side of the face plate, and the laser diode can be arranged to project a beam perpendicular to the face plate. The sensor can be arranged to monitor a parameter and output a signal indicative of a value of the parameter. The drive system can be disposed behind the rear side of the face plate, and can include a reflector rotatably attached to a motor. The reflector can be arranged to receive the projected beam from the laser diode and reflect the beam at a non-perpendicular angle to the angled indication area. The motor can be arranged to rotate the reflector so as to reflect the beam to a position on the indication area adjacent to a specific one of the plurality of indicia based on the signal output from the sensor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only and are not intended to limit the scope of the present disclosure.

Corresponding reference numerals indicate corresponding parts throughout the several views of the drawings.

DETAILED DESCRIPTION

The following description is merely exemplary in nature and is not intended to limit the present disclosure, application or uses.

Figure 1:
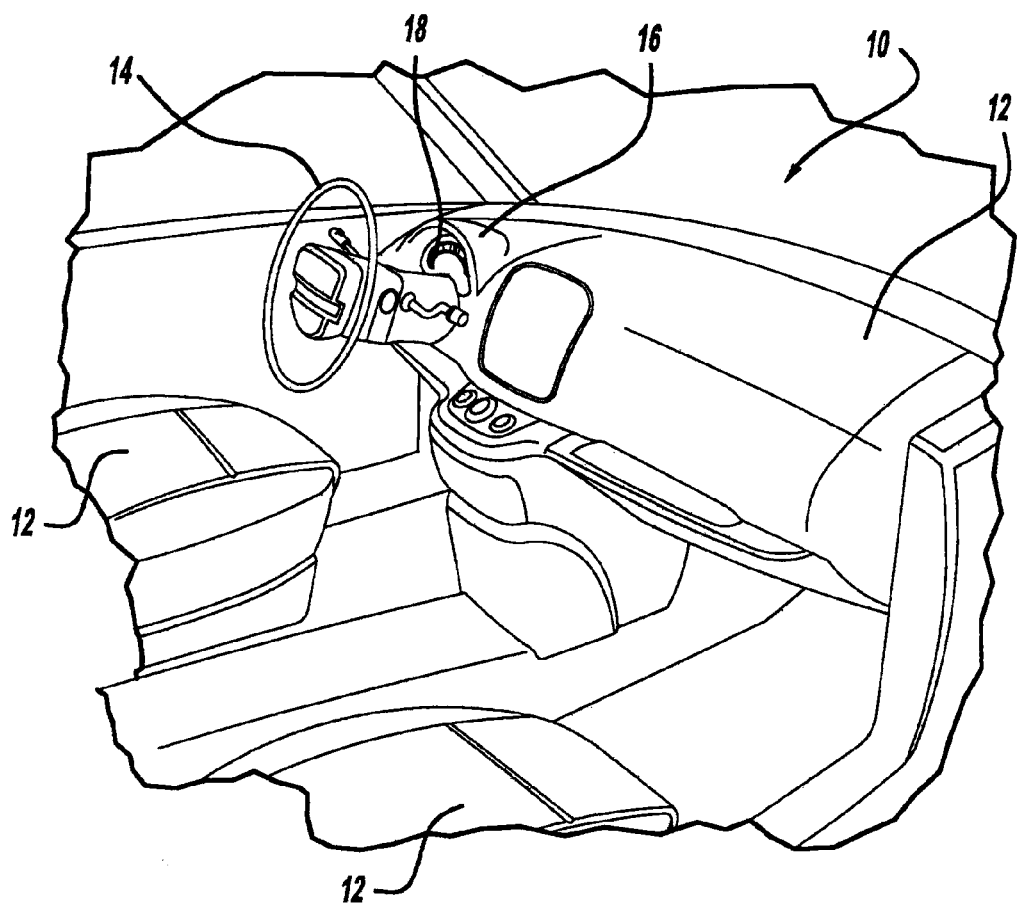
FIG. 1 is a partial perspective view of a vehicle interior according to the principles of the present disclosure.

With initial reference to FIG. 1, a partial vehicle interior 10 is shown in accordance with the teachings of the present disclosure. Interior 10 can include a dash 12, a steering wheel 14, and an instrument cluster 16. Instrument cluster 16 can include a plurality of gauges or indicating instruments, including a gauge 18 which is illustrated as a speedometer. While the present disclosure is being described using speedometer 18 as the gauge, it should be appreciated that other gauges, including but not limited to tachometers, engine oil temperature, engine coolant temperature, oil pressure, fuel level and the like can also incorporate the features described for speedometer 18.

Referring now to FIGS. 2-4A, speedometer 18 is illustrated in greater detail. Speedometer 18 can include a face plate 20 and a laser indication system 22. Face plate 20 can include a base plate 24, a gauge center 28, an indication area 32 disposed about gauge center 28, and a plurality of indicators or indicia 36 disposed on face plate 20 or indication area 32. Indication area 32 can include a bottom end or boundary 40 and a top end or boundary 44 spaced apart from bottom boundary 40. The indication area 32 can be angled or inclined rearward relative to a front side 46 of face plate 20 such that top boundary 44 is spaced apart from and behind front side 46 and the bottom boundary 40 is contiguous with front side 46 of face plate 20 as shown, for example, in FIGS. 3 and 4. Indication area 32 can further include a width 48, and in one exemplary form shown in FIG. 2, an arcuate shape 52 with width 48 increasing from a first end 56 to a second end 60 of indication area 32. While the indication area 32 has been shown as having arcuate shape 52 in FIG. 2, it should be appreciated that indication area 32 can be formed in various shapes as will be subsequently described in more detail.

The plurality of indicators 36 can be arranged in ascending order from first end 56 to second end 60 to indicate the speed of the vehicle. The plurality of indicators can represent miles per hour or kilometers per hour, or both. While the plurality of indicators 36 are shown as representing speed of the vehicle, the plurality of indicators 36 can indicate any set of values that can be measured or monitored by gauge 18.

The laser indicating system 22 can include a first printed circuit board 64, a second printed circuit board 68, a stationary laser diode 72, a rotatable reflector 76, and a motor 80. The first printed circuit board 64 can be mounted behind face plate 20 and the second printed circuit board 68 can be mounted between the first printed circuit board and face plate 20. In one configuration, a mechanical connector 84 can mount second printed circuit board 68 in spaced relation to first printed circuit board 64 as shown in FIG. 5. In another configuration, second printed circuit board 68 can be mounted to a rear side 88 of face plate 20 as shown in FIGS. 3 and 4. An electrical connection 92 can be provided between first and second printed circuit boards 64, 68, and this connection can be a separate connection as shown in FIG. 2, or can be through the mechanical connector 84 shown in FIG. 5.

Motor 80 can include a stepper motor and can be mounted to first printed circuit board 64. Rotatable reflector 76 can be mounted to motor 80 such that it is rotatable around an axis of rotation 96. Reflector 76 can be configured to have a reflection surface 78 that is parallel or substantially parallel to a rear side 82 of the angled indication area 32 that can be facing reflection surface 78. The axis of rotation 96 can be coincident with gauge center 28 as shown in FIGS. 3 and 4. Laser diode 72 can be mounted to second printed circuit board 68 and can emit a beam 100 towards reflector 76. The beam 100 emitted by laser diode 72 can be shaped and reflected by reflector 76 into a generally rectangular shaped or linear reflected beam 104 such that indication area 32 allows transmission of reflected beam 104 at a position radially inward and/or at the same radial position as the plurality of indicators 36 disposed on indication area 32.

Motor 80 can also electrically communicate with a sensor 108 which can transmit an electrical signal indicative of a speed of the vehicle. Responsive to the electrical signal, motor 80 can rotate reflector 76 around axis 96 which can, in turn, direct reflected beam 104 about indication area 32 in order to position reflected beam 104 adjacent or relative to a specific indicator of the plurality of indicators 36 to indicate the current speed of the vehicle. While reflected beam 104 is being described as a linear or rectangular beam, it should be understood that reflected beam 104 can be any shape that can indicate the speed of the vehicle.

Figure 2:
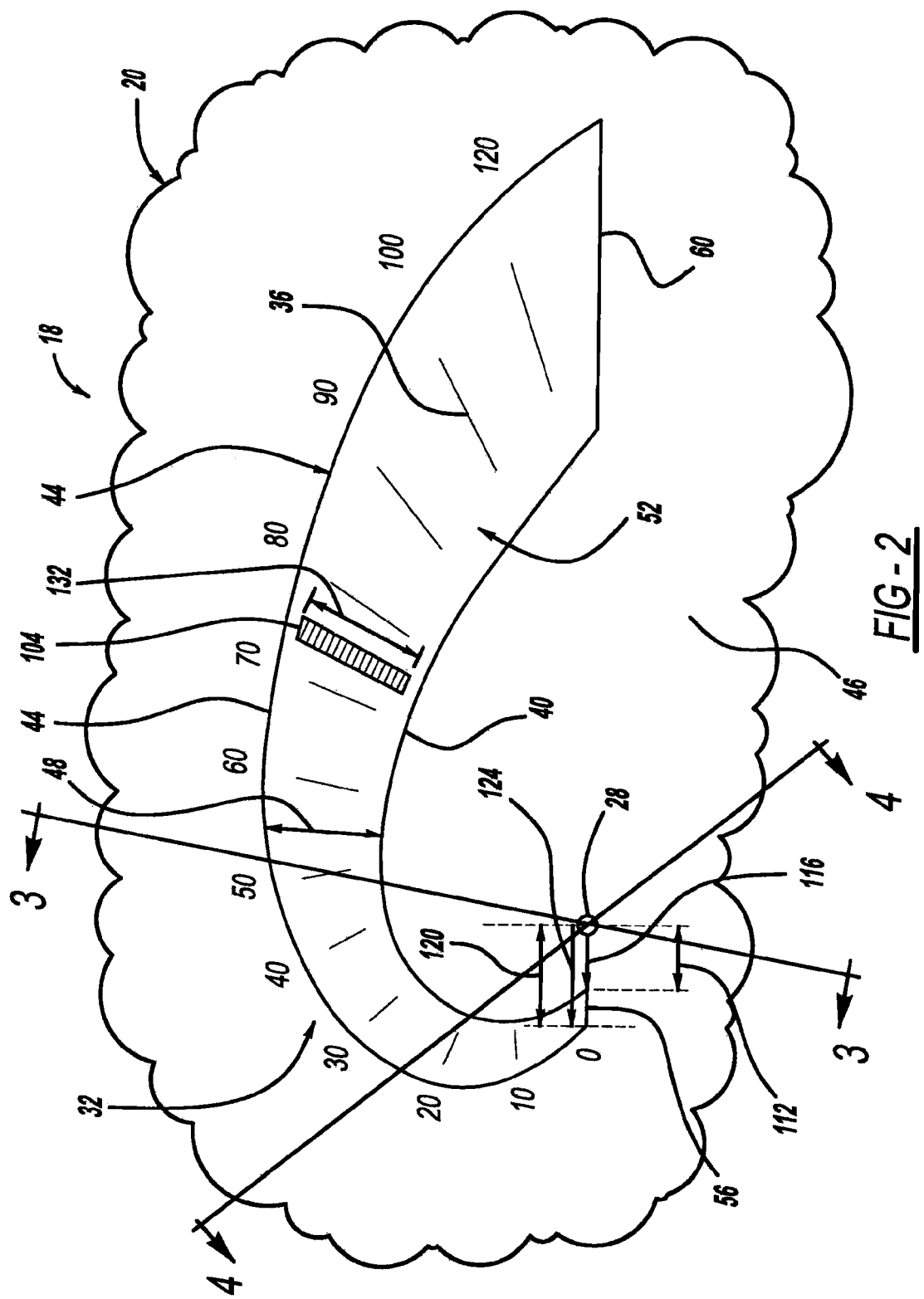
FIG. 2 is a front view of an exemplary vehicle speedometer gauge according to the principles of the present disclosure.
Figure 3:
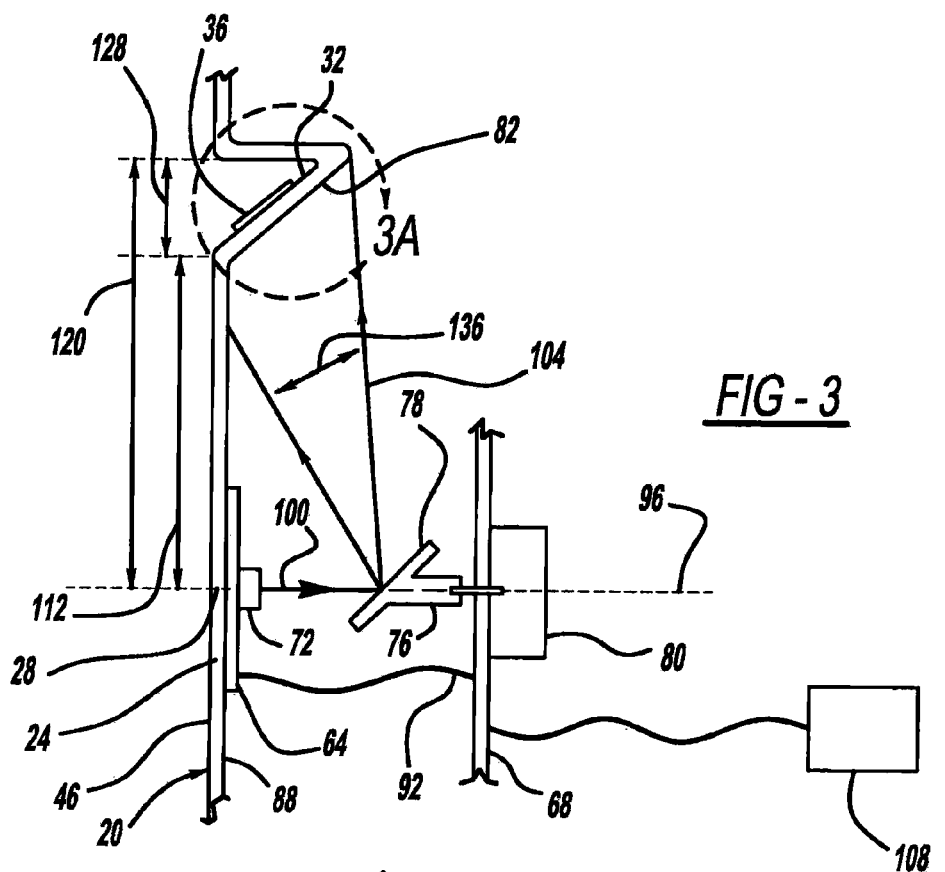
FIG. 3 is a schematic cross-sectional view of FIG. 2 taken along line 3-3 according to the principles of the present disclosure.
Figure 4:
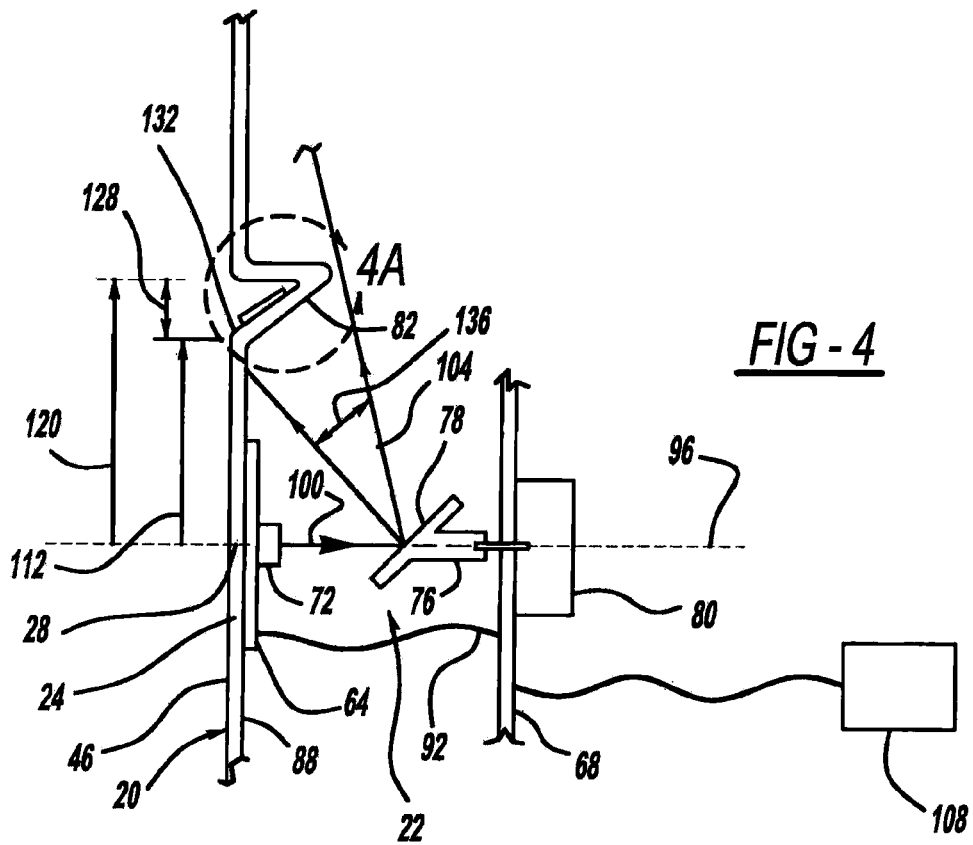
FIG. 4 is a schematic cross-sectional view of FIG. 2 taken along line 4-4 according to the principles of the present disclosure.

With continuing reference to FIGS. 2-4A, features and details of the indication area 32 of face plate 20 will now be presented. The shape, width and location of indication area 32 can be defined by radial distances of the bottom boundary 40 and top boundary 44 relative to gauge center 28. In addition, the shape of indication area 32 can be formed into a plurality of shapes by varying one or both of the radial distances that define the bottom and top boundaries 40, 44 of indication area 32 as will be described below in more detail using the exemplary shape 48 shown in FIG. 2 as an example. With particular reference to FIG. 2, the bottom boundary 40 can be spaced at a first radial distance 112 of a first radius 116 extending from gauge center 28 to first end 56. First radial distance 112 can continually increase as the first radius 116 is rotated about gauge center 28 from first end 56 to second end 60 of indication area 32.

In a similar fashion, the top boundary 44 of indication area 32 can be spaced at a second radial distance 120 of a second radius 124 extending from gauge center 28 to top boundary 4 at the first end 56 of indication area 32 as shown in FIG. 2. Second radial distance 120 and second radius 124 can be greater than first radial distance 112 at first end 56, and the second radial distance 120 can continually increase as the second radius 124 is rotated about gauge center 28 from first end 56 to second end 60 of indication area 32. The second radial distance 120 can also increase a greater amount than the first radial distance 112 for each radial position of first and second radii 116, 124 between the first and second ends 56, 60 thereby defining shape 52 with a continuously increasing width 48 between first and second ends 56, 60 as shown in FIG. 2.

In addition to the exemplary shape 52 shown in FIG. 2, indication area 32 can be configured into other sizes and shapes defined by first and second ends 56, 60 and top and bottom boundaries 44, 40. By way of example, the indication area 32 can be provided with a consistent width from first end 56 to second end 60 by maintaining a relative difference between the first and second radial distances 112, 120 constant from the first end 56 to the second end 60. This would maintain a consistent radial length 128 and therefore a consistent width 48 of indication area 32. Also, the first radial distance 112 can be increased or decreased to position the indication area 32 closer to or further from gauge center 28.

Figure 6:
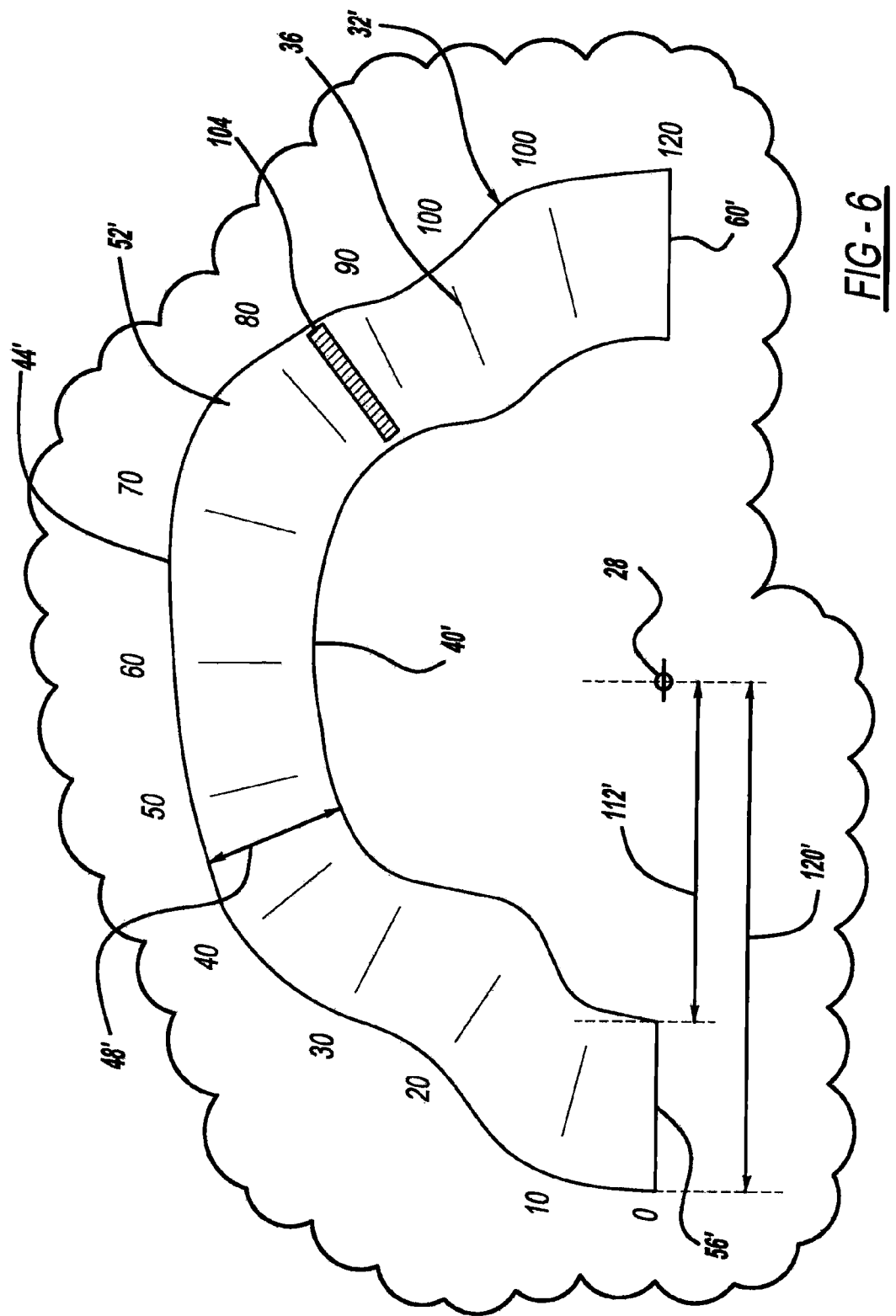
FIG. 6 is a front view of an alternative gauge indication area according to the principles of the present disclosure.

As another example, FIG. 6 illustrates an alternative exemplary shape 52' of speedometer 18. Shape 52' can have a first radial distance 112' and second radial distance 120' spaced apart to create to create a constant width 48'. The first and second radial distances 112', 120' can proportionally vary in a generally wavy pattern between first end 56' and second end 60' to create an indication area 32' with a shape 52' as shown in FIG. 6.

Figure 3A:
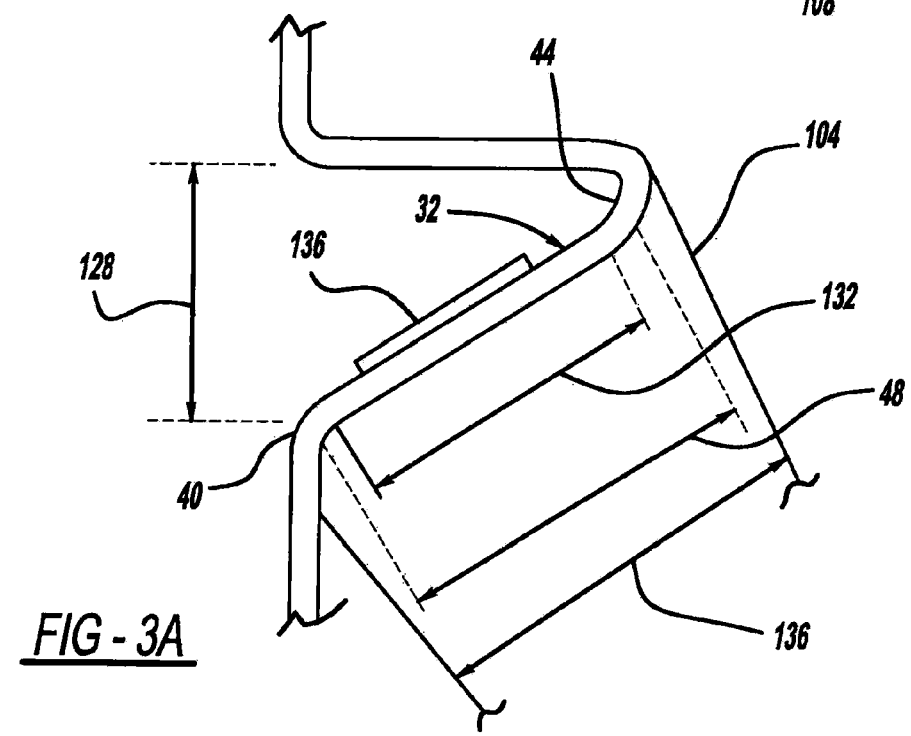
FIG. 3A is an enlarged sectional view of a portion of FIG. 3 according to the principles of the present disclosure.
Figure 4A:
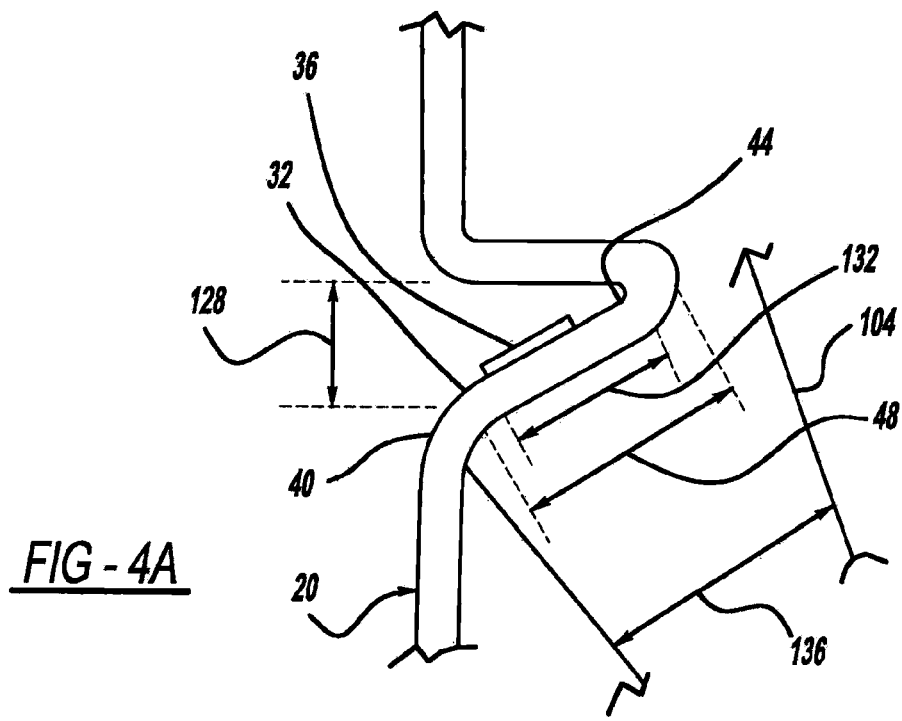
FIG. 4A is an enlarged sectional view of a portion of FIG. 4 according to the principles of the present disclosure.
Figure 5:
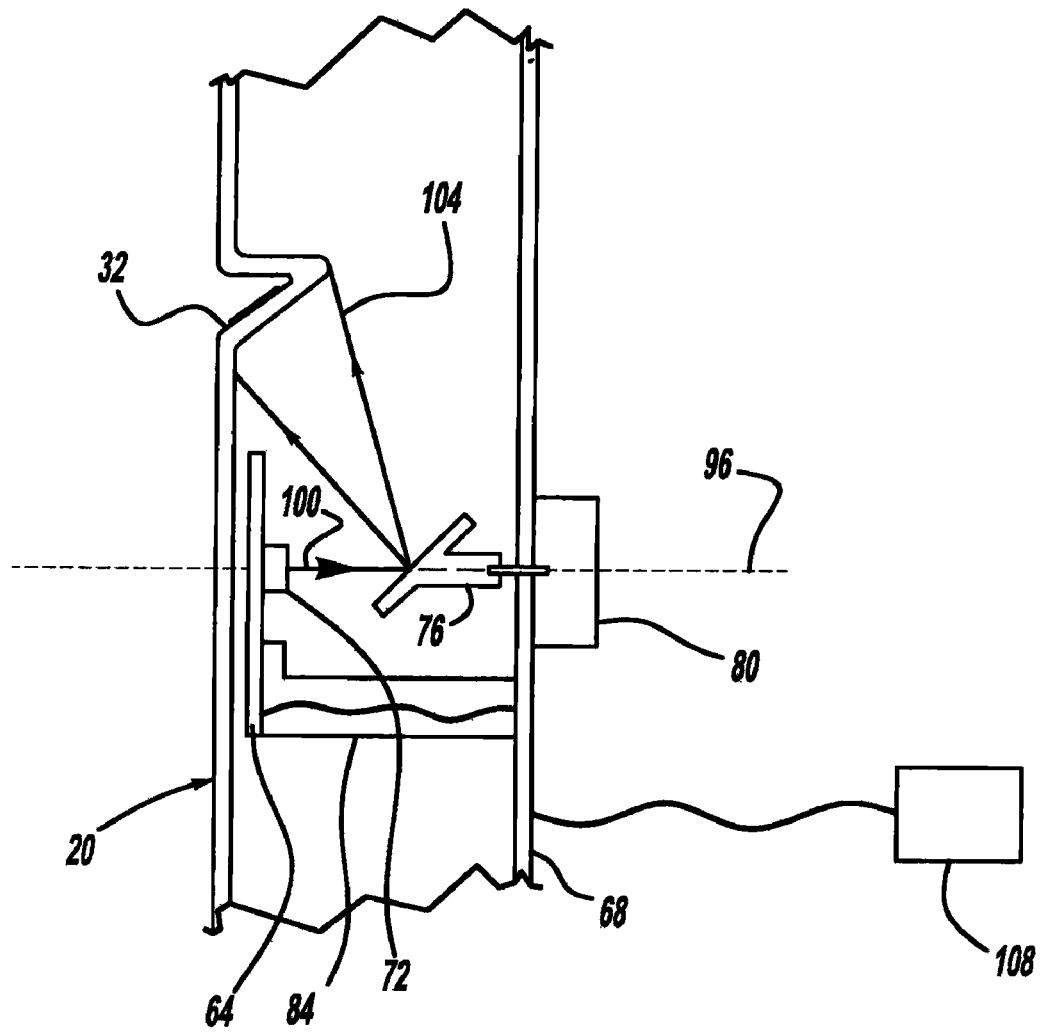
FIG. 5 is a schematic cross-sectional view of an exemplary speedometer gauge with an alternative drive system arrangement according to the principles of the present disclosure.

Turning now to FIGS. 3-4A, the radial length 128 can represent the difference between the first radial distance 112 and the second radial distance 120. Varying the radial distances 112, 120 relative to each other (as described above) can increase or decrease radial length 128 thereby proportionally increasing or decreasing width 48 of indication area 32. For example, radial length 128 in FIGS. 3, 3A is greater than radial length 128 in FIGS. 4, 4A thereby resulting in a greater width 48 of indication area 32 in FIG. 3 as compared to FIG. 4. Further, as the width 48 of indication area 32 increases, a width 132 of reflected beam 104 correspondingly increases as shown in FIGS. 3A and 4A. Width 48 can also include a generally planar cross-sectional shape between bottom boundary 40 and top boundary 44 as shown in FIGS. 3 and 4. It should be appreciated that width 48 can also include other cross-sectional shapes including, but not limited to a concave or convex cross-sectional shape between top and bottom boundaries 40, 44.

The reflected beam 104 can be reflected towards indication area 32 such that beam 104 can have a projecting width 136. Projecting width 136 can be configured such that it can cover indication area 32 being positioned at various locations or distances relative to gauge center 28, such as a position relatively close to center 28 as generally shown in FIG. 4, and a position further from center 28 as generally shown in FIG. 3. Laser diode 136 and reflector 76 can also be configured such that the projecting width 136 of reflected beam 104 increases as it reflects from reflector 76 towards angled indication area 32 as also shown in FIGS. 3 and 4.

Moreover, by providing indication area 32 with the rearward angle or incline relative to face plate 20, indication area 32 can act as a barrier to reflected beam 104 such that indication area 32 is able to receive reflected beam 104 while being located at various distances from gauge center 28 without having to vary the axis of rotation 96 of reflector 76. The angled nature of indication area 32 can also serve to reduce the projecting width 136 of reflected beam 104 that can be required to align reflected beam 104 with indication area 32 when it is positioned at various distances relative to gauge center 28.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A gauge, the gauge comprising:
   a face plate having a gauge center and an indication area disposed about the gauge center, the indication area having a bottom boundary and a top boundary spaced apart from the bottom boundary, the bottom boundary being spaced apart from the gauge center by a first radial distance, the indication area being angled rearward relative to a front side of the face plate such that the top boundary of the indication area is spaced rearward a distance from the front side of the face plate;
   a plurality of indicia disposed on one of the front side of the face plate and the indication area;
   a stationary laser diode positioned behind a rear side of the face plate and pointing away from the rear side of the face plate, the laser diode arranged to project a beam perpendicular to the face plate;
   a sensor arranged to monitor a parameter and output a signal indicative of a value of the parameter; and
   a drive system disposed behind the rear side of the face plate, the drive system arranged to rotate the projected beam from the laser to a position adjacent to a specific one of the plurality of indicia based on the signal output from the sensor.

2. The gauge of claim 1, wherein the drive system further comprises:
   a stepper motor; and
   a reflector rotatably attached to the motor, the reflector arranged to receive the projected beam from the laser diode and reflect the beam to the angled indication area, the motor arranged to rotate the reflector so as to reflect the beam to a position on the indication area adjacent to a specific one of the plurality of indicia based on the signal output from the sensor, and wherein the indication area is angled rearward relative to the front side of the face plate and towards the reflector.

3. The gauge of claim 2, wherein the reflector includes a reflection surface, the reflection surface being substantially parallel to a rear side of the angled indication area.

4. The gauge of claim 2, further comprising:
   a first printed circuit board, the drive system mounted to the first circuit board;
   a second printed circuit board, the laser diode mounted to the second printed circuit board; and
   a single connector for mechanically and electrically connecting the first and second printed circuit boards.

5. The gauge of claim 4, wherein the second printed circuit board is attached to a rear side of the face plate.

6. The gauge of claim 2, further comprising a longitudinal axis extending through the gauge center and perpendicular to the face plate, wherein the laser diode projects the beam coincident with the longitudinal axis, and wherein the motor is arranged to rotate the reflector about the longitudinal axis.

7. The gauge of claim 1, wherein the indication area is angled rearward relative to a front side of the face plate such that the top boundary is spaced rearward a distance from the front side of the face plate and the bottom boundary is contiguous with the front side of the face plate.

8. The gauge of claim 1, wherein the indication area further comprises a shape defined by the bottom boundary, a top boundary, and the first and second ends joining respective ends of the top and bottom boundaries, the top boundary being spaced apart from the gauge center by a second radial distance greater than the first radial distance and thereby defining a width of the indication area.

9. The gauge of claim 8, wherein the first radial distance of the bottom boundary varies in length as the first radial distance is rotated about the gauge center from the first end to the second end of the indication area.

10. The gauge of claim 9, wherein the second radial distance of the top boundary varies in length as the second radial distance is rotated about the gauge center from the first end to the second end of the indication area.

11. The gauge of claim 8, wherein the first radial distance of the bottom boundary continuously increases in length as the first radial distance is rotated about the gauge center from the first end to the second end of the indication area, and wherein the second radial distance of the top boundary continuously increases in length a greater amount than the first radial distance as the second radial distance is rotated from the first end to the second end of the indication area.

12. The gauge of claim 8, wherein the width of the indication area between the top and bottom boundaries is planar in cross-sectional shape.

13. A gauge, the gauge comprising:
a face plate having a gauge center and an indication area disposed about the gauge center, the indication area having a shape defined by a bottom boundary, a top boundary, and first and second ends joining respective ends of the top and bottom boundaries, the bottom boundary being spaced apart from the gauge center by a first radial distance, the top boundary being spaced apart from the gauge center by a second radial distance greater than the first radial distance and thereby defining a width of the indication area, the indication area being angled rearward relative to a front side of the face plate such that the top boundary of the indication area is spaced rearward a distance from the front side of the face plate and the bottom boundary is contiguous with the front side of the face plate;
a plurality of indicia disposed on one of the front side of the face plate and the indication area;
a stationary laser diode positioned behind a rear side of the face plate and pointing away from the rear side of the face plate, the laser diode arranged to project a beam perpendicular to the face plate;
a sensor arranged to monitor a parameter and output a signal indicative of a value of the parameter; and
a drive system disposed behind the rear side of the face plate, the drive system including a reflector rotatably attached to a stepper motor, the reflector arranged to receive the projected beam from the laser diode and reflect the beam to the angled indication area, the motor arranged to rotate the reflector so as to reflect the beam to a position on the indication area adjacent to a specific one of the plurality of indicia based on the signal output from the sensor.

14. The gauge of claim 13, wherein the width of the indication area between the top and bottom boundaries is planar in cross-sectional shape.

15. The gauge of claim 13, wherein the first radial distance of the bottom boundary varies in length as the first radial distance is rotated about the gauge center from the first end to the second end of the indication area.

16. The gauge of claim 15, wherein the second radial distance of the top boundary varies in length as the second radial distance is rotated about the gauge center from the first end to the second end of the indication area.

17. The gauge of claim 13, wherein the first radial distance of the bottom boundary continuously increases in length as the first radial distance is rotated about the gauge center from the first end to the second end of the indication area, and wherein the second radial distance of the top boundary continuously increases in length a greater amount than the first radial distance as the second radial distance is rotated from the first end to the second end of the indication area.

18. The gauge of claim 13, further comprising:
a first printed circuit board, the drive system mounted to the first circuit board;
a second printed circuit board, the laser diode mounted to the second printed circuit board; and
a single connector for mechanically and electrically connecting the first and second printed circuit boards.

19. The gauge of claim 13, further comprising a longitudinal axis extending through the gauge center and perpendicular to the face plate, wherein the laser diode projects the beam coincident with the longitudinal axis and the motor is arranged to rotate the reflector about the longitudinal axis, and wherein the top boundary of the angled indication area is angled towards the reflector.

20. A gauge, the gauge comprising:
a face plate having a gauge center and an indication area disposed about the gauge center, the indication area having a shape defined by a bottom boundary, a top boundary, and first and second ends joining respective ends of the top and bottom boundaries, the bottom boundary being spaced apart from the gauge center by a first radial distance, the top boundary being spaced apart from the gauge center by a second radial distance greater than the first radial distance and thereby defining a width of the indication area, the width of the indication area between the top and bottom boundaries being planar in cross-sectional shape, the indication area being angled rearward relative to a front side of the face plate such that the top boundary of the indication area is spaced rearward a distance from the front side of the face plate and the bottom boundary is contiguous with the front side of the face plate;
a plurality of indicia disposed on one of the front side of the face plate and the indication area;
a stationary laser diode positioned behind a rear side of the face plate and pointing away from the rear side of the face plate, the laser diode arranged to project a beam perpendicular to the face plate;
a sensor arranged to monitor a parameter and output a signal indicative of a value of the parameter; and
a drive system disposed behind the rear side of the face plate, the drive system including a reflector rotatably attached to a stepper motor, the reflector arranged to receive the projected beam from the laser diode and reflect the beam to the angled indication area, the reflector having a reflection surface substantially parallel to a rear side of the angled indication area facing the reflection surface, the motor arranged to rotate the reflector so as to reflect the beam to a position on the indication area adjacent to a specific one of the plurality of indicia based on the signal output from the sensor.

* * * * *